ically useful, because the process may be carried out in a single working step and the final product need not be subjected to any further comminution treatment.

United States Patent Office 3,459,714
Patented Aug. 5, 1969

3,459,714
PROCESS FOR THE PREPARATION OF POLYAMIDES IN FINELY GRAINED FORM
Wolfgang Wolfes, Witten-Bommern, Gustav Renckhoff, Witten (Ruhr), and Hans-Leo Huelsmann, Wittten-Rudinghausen, Germany, assignors to Chemische Werke Witten GmbH, Witten (Ruhr), Germany
No Drawing. Filed July 9, 1965, Ser. No. 470,873
Claims priority, application Germany, Aug. 5, 1964, C 33,572
Int. Cl. C08g 20/20
U.S. Cl. 260—78
12 Claims

ABSTRACT OF THE DISCLOSURE

The present disclosure is directed to a process for the preparation of polyamides of aliphatic and cycloaliphatic dicarboxylic acids in finely grained form which comprises reacting a diester of an acid selected from the group consisting of aliphatic dicarboxylic acids and cycloaliphatic dicarboxylic acids with an organic primary diamine at a first temperature of from about 20° to 250° C. in the presence of an organic liquid which is a nonsolvent for the resultant polyamide to give a preliminary condensate, and subsequently further condensing said prelininary condensate by heating it to a second temperature between said first temperature and a temperature just below the melting range of the resultant polyamide. The powdery polyamides are useful per se for processing in, for example, injection molding or extrusion machines.

---

This invention relates to the preparation of polyamides. More particularly, it relates to a process for the preparation of polyamides of aliphatic and cycloaliphatic dicarboxylic acids. Even more particularly, the invention relates to a process for the preparation of polyamides of aliphatic and cycloaliphatic dicarboxylic acids in finely grained form.

Polyamides of aliphatic dicarboxylic acids are conventionally prepared by condensing the acids with diamines in the melt at temperatures around 270° C. Besides the free dicarboxylic acids, the esters thereof are also suitable starting materials for the preparation of polyamides. When using the esters as starting materials, the final degree of polycondensation is also obtained only in the melt (Houben Weyl, volume 14/2, page 139).

In these prior art methods of preparation, the thermal stress to which the resultant polyamide is subjected is so great that decomposition reactions may set in during the synthesizing process of the polycondensation reaction. Hence, for processing on injection molding machines, the molten polyamide must first be granulated in a separate working step. Such a preliminary treatment becomes even more expensive if a polyamide powder is required for the injection molding machine treatment, such as, for example, in the vortex sintering process. And, if solutions of polyamides are desired, the substance to be dissolved must be available in as finely a divided form as possible.

One of the objects of the present invention is to provide an improved process for the preparation of polyamides of aliphatic and cycloaliphatic dicarboxylic acids which overcomes the disadvantages and deficiencies of the methods mentioned hereinabove.

Another object of the present invention is to provide a process for the preparation of polyamides of aliphatic and cycloaliphatic dicarboxylic acids in finely grained or granulated form which may be carried out in an efficacious and economical manner.

A further object of the invention is to provide a process for the preparation of polyamides of aliphatic and cycloaliphatic dicarboxylic acids in finely granulated form which may be carried out easily and simply and which avoids the aforementioned problems of the prior art processes.

These and other objects of the present invention will become apparent to those skilled in the art from a reading of the following specification and claims.

In accordance with the present invention, it has been found that polyamides of aliphatic and cycloaliphatic dicarboxylic acids, which may be substituted with alkyl groups, may be obtained in a readily treatable, finely grained or granulated form by reacting the diesters of these acids with approximately equivalent amounts of a primary aliphatic or alkaryl diamine in an organic liquid which behaves as a nonsolvent with respect to the polyamide. The process is carried out with stirring at temperatures of between 20° to 250° C. Subsequent condensation is then carried out by further heating at the same or a higher temperature, the temperature, however, being below the melting range of the polyamide being produced. The diesters of the aliphatic or cycloaliphatic dicarboxylic acids employed are those derived from phenol or phenols substituted with one or several lower alkyl groups, such as the diphenyl ester, dicresyl ester, bis-(tert-butylphenyl) ester, dixylyl ester, etc.

If the initially formed oligomeric amides become dissolved to a certain extent by the phenol being formed and thereby glued or fused together, it is advisable to carry out the condensation process of the present invention in two stages. The first stage involves initially letting the condensation reaction proceed at temperatures below about 100° C. The final degree of condensation is thereafter obtained by slowly increasing the temperature above this point.

The degree of polymerization may be varied as desired by modifying the temperature and time of the subsequent heating operation; molecular weights corresponding to a relative solvent viscosity of 1.8 are required in order to obtain polyamides having useful and workable properties.

The permissible upper temperature limit for the subsequent condensation depends upon the lower limit of the melting range of the produced polyamide. If a temperature above this range were used, the polyamide particles would stick together and it would no longer be possible to obtain the desired powdered form of product. This upper temperature limit may be easily determined by a preliminary test to determine the melting range of the particular polyamide being produced. Generally, the subsequent condensation will be carried out at temperature of from about 100° C. to about 250° C.

When the condensation is completed, the finely granulated polyamide is separated from the suspension and washed with a readily volatile agent, for example, methanol. Thereafter, a subsequent treatment is carried out in a suitable apparatus such as a tumbling drier at an elevated temperature. If desired, a vacuum may be applied thereto so as to remove the last traces of any possibly adhering volatile substances.

The acid reactants which may be employed in the process of the present invention are the diaryl ester of aliphatic or cycloaliphatic dicarboxylic acids such as oxalic acid, adipic acid, sebacic acid, hexahydroterephthalic acid or hexahydroisophthalic acid, or the substituted derivatives thereof, such as the halogenated derivatives, for example, α-chloro-, α-bromo-, etc. As pointed out above, the diphenyl or substituted diphenyl esters of the aliphatic or cycloaliphatic dicarboxylic acids are employed in the process of the present invention. This includes the diesters derived from phenol or lower alkyl-substituted phenols. The term "lower alkyl" is meant to refer to alkyl groups containing less than five carbon atoms, such as methyl-, ethyl-, propyl-, isopropyl-, butyl-, tert-butyl-, etc. Thus, besides phenol, examples of alkyl-substituted phenols which may be used to form the ester function of the compound to be reacted with the diamine include the isomeric cresols, xylenols, tert-butylphenols, etc. The diesters can be prepared according to conventional procedures.

Any of the primary aliphatic or alkaryl diamines customarily used in the preparation of polyamides may be used as the diamine component in the process of the present invention. These include, for example, tetramethylenediamine, hexamethylenediamine, decamethylenediamine, xylylenediamine.

The diester component and the diamine component are preferably reacted in approximately equivalent amounts. By "equivalent amounts" is meant that the number of ester groups to be reacted is approximately equal to the number of amino groups to be reacted.

Solvents to be utilized during the carrying out of the reaction of the present invention are those that dissolve the diesters and diamines but do not react therewith and should not, moreover, have any swelling or dissolving effect on the polyamides formed. Furthermore, the solvents should be infinitely miscible with the phenols being formed. Aromatic hydrocarbons, such as benzene, toluene, xylene, diethylbenzene and dodecylbenzene, have been found to be particularly suitable solvents therefor.

In case the oligomeric amides are slightly dissolved by the phenol being freed, as, for example, those of the cycloaliphatic dicarboxylic acids, it has been found to be particularly advantageous to let the preliminary condensation proceed in boiling benzene and then subsequently to set the required higher temperature by a continuous exchange of the benzene against a higher-boiling hydrocarbon, instead of by a pressure increase such as is obtained by working in an autoclave. To carry out the procedure in this manner, the suspension of preliminary condensate is gradually heated to higher temperatures and the new and higher-boiling solvent added to the mixture in the same degree or amount as the originally used solvent distills off. With this method, solvents other than aromatic hydrocarbons may be employed. The only condition is that the new higher-boiling solvent be a nonsolvent for the polyamide being formed. Accordingly, in addition to the aforementioned aromatic hydrocarbons, aliphatic hydrocarbons such as the corresponding paraffin fractions, for example, Kogasin I and Kogasin II, may be used. Kogasin I and II are trade names for mixtures of normal paraffins having an average chain length of 12 to 14 carbon atoms. They are made by the "Fischer-Tropsch Synthesis." By the same token, corresponding paraffin fractions from mineral oil may be utilized.

By virtue of their powdery structure, the polyamides obtained by the process of the present invention may be easily dissolved in the conventional polyamide solvents, such as phenol/tetrachloroethane, etc., and further treated as desired. On the other hand, they may be employed immediately in processing techniques on injection molding or extrusion machines to the extent that polyamides are suitable therefor. Hence, any of the known useful polyamide products may be prepared by a further processing of the product resulting from the process of the present invention.

The following examples are given merely as illustrative of the present invention and are not to be considered as limiting thereof.

The relative solution viscosity of the polyamides indicated in the following examples for characterizing the degree of polymerization thereof was determined by measuring the viscosity of a 1% polymeric solution (1 gram of substance to 100 cc. of solution) in phenol/tetrachloroethane (60/40) in the Ostwald viscosimeter at a temperature of 25° C.

EXAMPLE I

Preparation of polydecamethyleneoxamide

In a 750 ml. 3-necked flask equipped with stirrer, reflux cooler, dropping funnel and thermometer, 24.2 grams of diphenyl oxalate (0.1 mole) is dissolved in 150 ml. of diethylbenzene. Under a nitrogen atmosphere, 17.2 grams of decamethylenediamine, which had been dissolved in 50 ml. of diethylbenzene at 60° C., is dropped into the reaction mixture at 180° C. over a time period of approximately ten minutes. The reaction mixture is stirred well during this time. After a short period of time, a finely grained substance is precipitated. It is stirred for another four hours at the boiling temperature of the diethylbenzene. After the reaction mixture has cooled, the polyamide powder is suctioned off and washed several times with methanol so as to remove any remaining traces of diethylbenzene and phenol adhering to the polyamide. The polyamide powder is then dried.

The relative solution viscosity (relative viscosity as noted above) of the polyamide product is 2.95.

The polyamide may be melted down at 275° C. to a viscous transparent mass.

EXAMPLE II

Preparation of polyhexamethyleneadipamide

In a 3-necked flask, 29.8 grams of diphenyl adipate (0.1 mole) is dissolved in 150 ml. of benzene. A solution of 11.6 grams of hexamethylenediamine (0.1 mole) in 50 ml. of benzene is added thereto dropwise at 80° C. while stirring well. After the mixture—from which a preliminary condensate is precipitated in finely grained form after a short time—has been additionally stirred for another hour at 80° C., the entire content of the flask is transferred to a stirring autoclave. Subsequent condensation is then carried out in a nitrogen atmosphere while stirring for seven hours at 170° C.

The further treatment of the polyamide powder is the same as that described in Example I.

The relative viscosity of the polyamide obtained in this example is 2.06.

EXAMPLE III

Preparation of polyhexamethyleneadipamide 14.9 grams of adipic acid diphenyl ester (0.05 mole) is dissolved in 150 ml. of dodecylbenzene. Over a period of approximately 15 minutes, a warm solution of 5.8 grams of hexamethylenediamine in 50 ml. of dodecylbenzene is dropped into the ester solution at 90° C. while stirring well and under nitrogen as a protective gas. Further stirring thereof is carried out at 90° C. for one-half hour. Thereafter, the temperature is increased to 190° C. within two to three hours and the subsequent condensation carried out for three additional hours at this temperature.

The further treatment of the polyamide powder is the same as described in Example I.

The relative viscosity of the polyamide product is 2.65.

EXAMPLE IV

Preparation of polytetramethylenesebacamide 17.7 grams of sebacic acid diphenyl ester (0.05 mole) is dissolved in 150 ml. of diethylbenzene. While stirring well and under nitrogen as the protective gas, a solution of 4.4 grams of tetramethylenediamine (0.05 mole) is 50 ml. of diethylbenzene is dropped into the solution within 15 minutes at 180° C. The subsequent condensation is carried out at the same temperature for another four hours. The resultant polyamide product is further treated as described in Example I.

The relative viscosity of the polyamide is 3.12.

EXAMPLE V

Preparation of polytetramethylenesebacamide

As described in Example IV, 38.2 grams of sebacic acid dicresylester (0.1 mole) is reacted with 8.8 grams of tetramethylenediamine (0.1 mole) in 200 ml. of diethylbenzene.

The relative viscosity of the resultant polyamide product is 2.26.

EXAMPLE VI

Preparation of polytetramethylenesebacamide

In the same manner as described in Example IV, 23.3 grams of sebacic acid bis-(tertiary-butylphenyl) ester (0.05 mole) is reacted with 4.4 grams of tetramethylenediamine (0.05 mole) in 200 ml. of diethylbenzene. The condensation temperature is maintained at 165° C.

The relative viscosity of the polyamide product is 1.89.

EXAMPLE VII

Preparation of poly-meta-xylenesebacamide 17.7 grams of sebacic acid diphenyl ester (0.05 mole) is dissolved in 150 ml. of diethylbenzene. At 80° C. while stirring well and under nitrogen, a solution of 6.8 grams of meta-xylylenediamine (0.05 mole) in 50 ml. of diethylbenzene is added thereto dropwise over a period of ten minutes. Thereafter, the temperature is increased to 160° C. and the subsequent condensation is carried out at this temperature for three hours. Subsequent treatment of the precipitated polyamide powder is the same as described in Example I.

The relative viscosity of the resultant polyamide is 1.82.

EXAMPLE VIII

Preparation of polyhexamethylenehexahydroterephthalamide 32.4 grams of hexahydroterephthalic acid diphenyl ester (0.1 mole) is dissolved in 150 ml. of benzene. While stirring well, a solution of 11.6 grams of hexamethylenediamine in 50 ml. of benzene is added thereto dropwise at 80° C. over a period of ten minutes. Further stirring is effected in boiling benzene for four hours and the benzene is thereafter distilled off, at which time dimethylbenzene is simultaneously added dropwise in the same volume or proportion as the amount of benzene distilling off. The temperature in the reaction mixture thereby rises slowly to 177° C. The subsequent condensation is carried out at this temperature under nitrogen for another five hours.

Subsequent treatment of the precipitated polyamide powder is the same as described in Example I.

The relative viscosity of the resultant polyamide is 2.18.

The invention being thus described, it will be obvious that the same may be varied in many ways. Such variations are not to be regarded as a departure from the spirit and scope of the invention and all such modifications are intended to be included within the scope of the following claims.

We claim:

1. A process for the preparation of polyamides of aliphatic and cycloaliphatic dicarboxylic acids in finely grained form which comprises reacting, in the absence of a swelling agent, a mixture consisting essentially of a diphenyl or lower alkyl-substituted diphenyl diester of an acid selected from the group consisting of aliphatic dicarboxylic acids and cycloaliphatic dicarboxylic acids with an organic primary diamine at a first temperature of from about 20° to 250° C. with stirring in the presence of an organic liquid which is a nonsolvent for the resultant polyamide to give a low molecular weight preliminary condensate oligoamide, and subsequently further condensing said preliminary condensate by heating it to a second temperature between said first temperature and a temperature just below the melting range of the resultant polyamide.

2. The process of claim 1, wherein said diester and said diamine are reacted in approximately equivalent amounts.

3. The process of claim 1, wherein said organic liquid is an aromatic hydrocarbon.

4. The process of claim 1, wherein during the further condensation of said preliminary condensate said organic liquid is replaced by a higher boiling nonsolvent for the polyamide.

5. The process of claim 1, wherein said second temperature is approximately the same as said first temperature.

6. A process for the preparation of polyamides of aliphatic and cycloaliphatic dicarboxylic acids in finely grained form which comprises reacting, in the absence of a swelling agent, a mixture consisting essentially of a diphenyl or lower alkyl-substituted diphenyl diester of an acid selected from the group consisting of aliphatic dicarboxylic acids and cycloaliphatic dicarboxylic acids with a diamine selected from the group consisting of primary aliphatic diamines and primary alkaryl diamines, said diester and said diamine being reacted in approximately equivalent amounts, at a first temperature of from about 20° to 250° C. with stirring in the presence of an aromatic hydrocarbon which is a nonsolvent for the resultant polyamide to give a low molecular weight preliminary condensate oligoamide, and subsequently further condensing said preliminary condensate by heating it to a second temperature below the melting range of the resultant polyamide.

7. The process of claim 6, wherein during the further condensation of said preliminary condensate said aromatic hydrocarbon nonsolvent is replaced by a higher boiling nonsolvent for the polyamide.

8. The process of claim 6, wherein said diester is selected from the group consisting of diphenyl oxalate, diphenyl adipate, diphenyl sebacate, dicresyl sebacate, bis-(tertiarybutylphenyl) sebacate and diphenyl hexahydroterephthalate and said diamine is selected from the group consisting of tetramethylenediamine, hexamethylenediamine, decamethylenediamine and meta-xylylenediamine.

9. The process of claim 6, wherein said diester is diphenyl adipate and said diamine is hexamethylenediamine.

10. The process of claim 6, wherein said diester is diphenyl sebacate and said diamine is tetramethylenediamine.

11. The process of claim 6, wherein said diester is diphenyl hexahydroterephthalate and said diamine is hexamethylenediamine.

12. The process of claim 7, wherein the aromatic hydrocarbon nonsolvent is replaced by a higher boiling nonsolvent for the polyamide by gradually heating the suspension of preliminary condensate to higher temperatures and adding the new and higher-boiling solvent to the mixture in the same amount as the originally used solvent is removed by distillation.

References Cited

UNITED STATES PATENTS 3,379,695   4/1968   Wolfes et al. _____ 260—78

HAROLD D. ANDERSON, Primary Examiner

U.S. Cl. X.R.

260—95